United States Patent
Moriya et al.

(10) Patent No.: US 12,308,423 B2
(45) Date of Patent: May 20, 2025

(54) SECONDARY CELL

(71) Applicant: Panasonic Intellectual Property Management Co., Ltd., Osaka (JP)

(72) Inventors: Shigeki Moriya, Osaka (JP); Nobuhiro Sakitani, Tokushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 724 days.

(21) Appl. No.: 17/438,253

(22) PCT Filed: Mar. 6, 2020

(86) PCT No.: PCT/JP2020/009589
§ 371 (c)(1),
(2) Date: Sep. 10, 2021

(87) PCT Pub. No.: WO2020/189324
PCT Pub. Date: Sep. 24, 2020

(65) Prior Publication Data
US 2022/0190323 A1   Jun. 16, 2022

(30) Foreign Application Priority Data
Mar. 18, 2019   (JP) .................. 2019-050158

(51) Int. Cl.
*H01M 4/36* (2006.01)
*H01M 4/02* (2006.01)
*H01M 10/0587* (2010.01)

(52) U.S. Cl.
CPC ....... *H01M 4/366* (2013.01); *H01M 10/0587* (2013.01); *H01M 2004/021* (2013.01); *H01M 2004/028* (2013.01)

(58) Field of Classification Search
CPC ...... H01M 4/0404; H01M 4/13; H01M 4/139; H01M 4/366; H01M 10/0431;
(Continued)

(56) References Cited

U.S. PATENT DOCUMENTS

2005/0069775 A1   3/2005   Hwang et al.
2005/0266315 A1   12/2005   Sato et al.
(Continued)

FOREIGN PATENT DOCUMENTS

EP   3373367 A1   9/2018
JP   6-290774 A   10/1994
(Continued)

OTHER PUBLICATIONS

International Search Report dated Jun. 2, 2020, issued in counterpart International Application No. PCT/JP2020/009589. (2 pages).
(Continued)

*Primary Examiner* — Matthew T Martin
*Assistant Examiner* — Ankith R Sripathi
(74) *Attorney, Agent, or Firm* — WHDA, LLP

(57) ABSTRACT

A secondary cell that is one example of this embodiment comprises a winding-type electrode body in which a positive electrode and a negative electrode are wound with a separator interposed therebetween. The positive electrode has: a positive-electrode collector body; a first positive-electrode mixture layer formed on a first surface of the positive-electrode collector body facing the outer side of the electrode body; and a second positive-electrode mixture layer formed on a second surface of the positive-electrode collector body facing the inner side of the electrode body. The first positive-electrode mixture layer includes a first positive-electrode active material, and the second positive-electrode mixture layer includes a second positive-electrode active material, the average surface roughness of the first
(Continued)

positive-electrode active material being greater than the average surface roughness of the second positive-electrode active material.

7 Claims, 4 Drawing Sheets

(58) Field of Classification Search
CPC .......... H01M 10/052; H01M 10/0587; H01M 2004/021; H01M 2004/028; H01M 2004/028429
See application file for complete search history.

(56) References Cited

U.S. PATENT DOCUMENTS

2007/0231698 A1  10/2007  Kawase et al.
2018/0287202 A1  10/2018  Matsushita et al.
2019/0273235 A1*  9/2019  Uematsu ............. H01M 50/423

FOREIGN PATENT DOCUMENTS

| JP | 2005-108810 A | 4/2005 |
| JP | 2007-273182 A | 10/2007 |
| JP | 2014-110105 A | 6/2014 |
| JP | 2016-106376 A | 6/2016 |
| JP | 2017-107727 A | 6/2017 |
| WO | 2016/046868 A1 | 3/2016 |
| WO | 2017/057078 A1 | 4/2017 |
| WO | 2019/031543 A1 | 2/2019 |

OTHER PUBLICATIONS

The Extended European Search Report dated Apr. 5, 2022, issued in counterpart EP Application No. 20772897.3. (8 pages).

* cited by examiner

SECONDARY CELL

TECHNICAL FIELD

The present disclosure generally relates to a secondary battery, and in more detail relates to a secondary battery comprising a winding-type electrode assembly.

BACKGROUND ART

The electrodes constituting a winding-type electrode assembly have current collectors and mixture layers formed on the surfaces of the current collectors. The mixture layers include a first mixture layer formed on the first surface of the current collector facing inside of the electrode assembly, and a second mixture layer formed on the second surface of the current collector facing outside of the electrode assembly. Patent Literature 1 discloses a non-aqueous electrolyte secondary battery having an active material filling density of the first negative electrode mixture layer that is smaller by 5% to 20% than an active material filling density of the second negative electrode mixture layer in order to improve cycle characteristics of the battery.

CITATION LIST

Patent Literature

PATENT LITERATURE 1: Japanese Unexamined Patent Application Publication No. Hei06-290774

SUMMARY

Technical Problem

By the way, in the electrode constituting a winding-type electrode assembly, the second mixture layer is stretched when wound to form a gap between active material particles, and the density of the second mixture layer tends to decrease. On the other hand, the first mixture layer is compressed when wound to reduce a gap between the active material particles, and the density tends to increase. In other words, a density difference occurs between the first mixture layer and the second mixture layer. Accordingly, the battery reaction is considered to be heterogeneous between the first mixture layer and the second mixture layer, lowing cycle characteristics of the battery.

An object of the present disclosure is to improve cycle characteristics in a secondary battery comprising a winding-type electrode assembly.

Solution to Problem

The secondary battery that is one aspect of the present disclosure is a secondary battery comprising a winding-type electrode assembly in which a positive electrode and a negative electrode are wound with a separator interposed therebetween, wherein the positive electrode and the negative electrode each has a current collector, a first mixture layer formed on a first surface of the current collector facing inside of the electrode assembly, and a second mixture layer formed on a second surface of the current collector facing outside of the electrode assembly. In at least one of the positive electrode and the negative electrode, the first mixture layer includes a first active material, the second mixture layer includes a second active material, and an average surface roughness of the first active material is larger than an average surface roughness of the second active material.

Advantageous Effects of Invention

According to one aspect of the present disclosure, cycle characteristics can be improved in a secondary battery comprising a winding-type electrode assembly.

DESCRIPTION OF EMBODIMENTS

The present inventors have found that cycle characteristics of a battery are specifically improved in a secondary battery comprising a winding-type electrode assembly, by using a first active material for a first mixture layer facing inside of the electrode assembly, and using a second active material for a second mixture layer facing outside of the electrode assembly, and rendering larger an average surface roughness of the first active material than an average surface roughness of the second active material. The density difference between the first mixture layer and the second mixture layer is considered to be reduced by applying such an electrode structure to inhibit a heterogeneous battery reaction, resulting in improving cycle characteristics of the battery.

Examples of the embodiments of the present disclosure will be described in detail below. Since the drawings referred to in the description of the embodiments are schematically illustrated, the dimensional ratio, etc., of each component should be determined in consideration of the following description. As used herein, the representation "a numerical value A to a numerical value B" means the numerical value A or more and the numerical value B or less unless otherwise specified.

In the present embodiment, a secondary battery 10 in which a winding-type electrode assembly 14 is housed in a bottomed cylindrical outer can 16, is illustrated, and the outer can is not limited to the cylindrical outer can, and may be for example, a square outer can, or an outer body composed of a laminated sheet including a metal layer and a resin layer. The electrode assembly may have a wound structure and may be formed into a flat shape.

Figure 1:
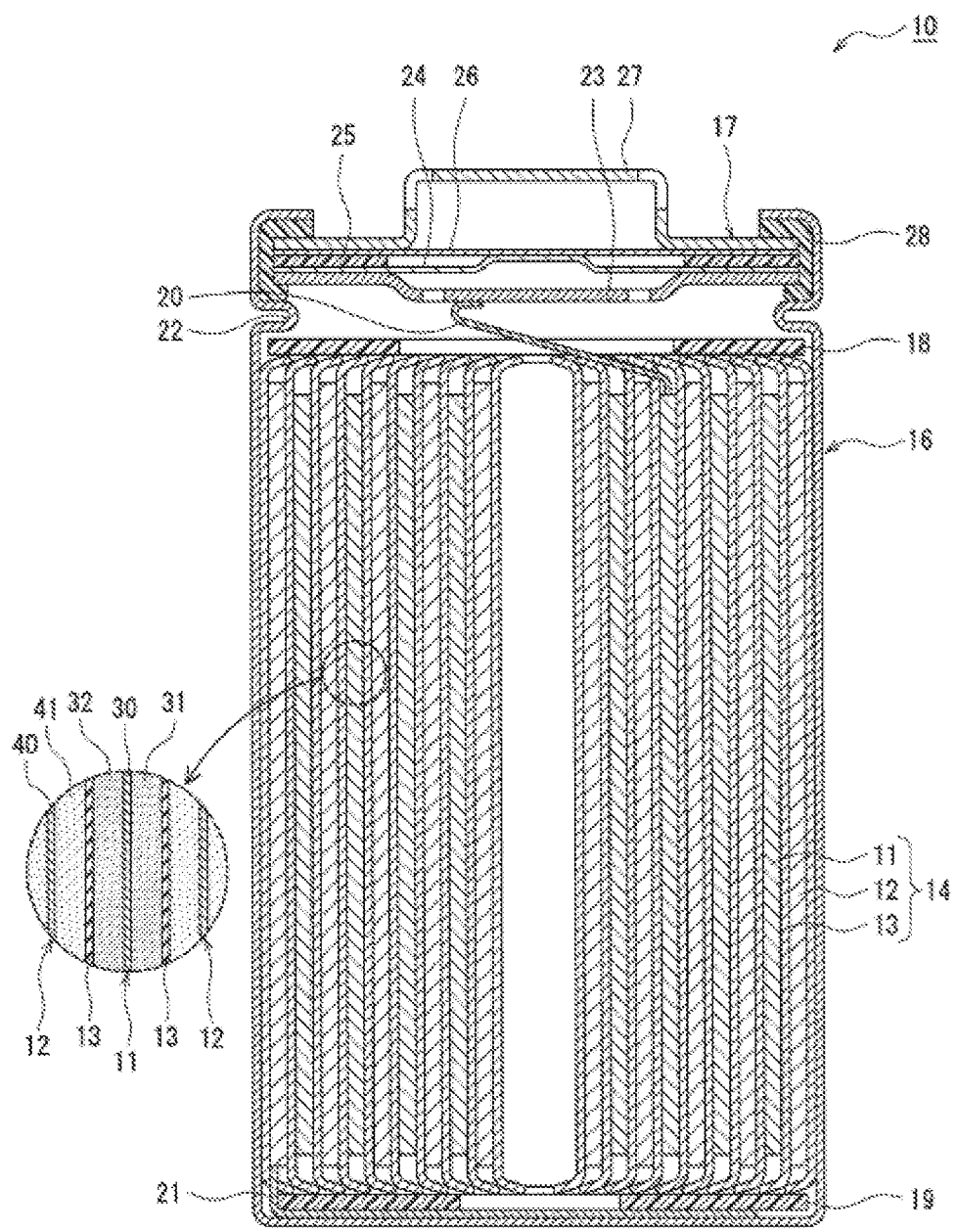
FIG. 1 is a cross sectional plan view of a secondary battery which is an example of an embodiment.
Figure 2:
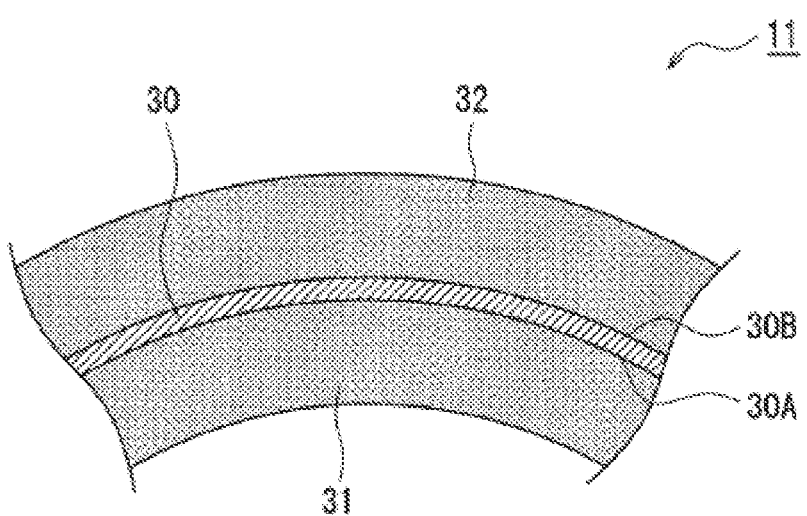
FIG. 2 is a cross sectional plan view of a positive electrode which is an example of an embodiment.

FIG. 1 is a cross-sectional plan view of secondary battery 10 which is an example of an embodiment. As illustrated in FIG. 1, secondary battery 10 comprises electrode assembly 14, an electrolyte (not shown), and outer can 16 housing electrode assembly 14 and the electrolyte. Electrode assembly 14 has a positive electrode 11, a negative electrode 12, and a separator 13, and has a wound structure in which positive electrode 11 and negative electrode 12 are spirally wound with separator 13 interposed therebetween. Outer can 16 is a bottomed cylindrical metal container having an opening on one side in the axial direction, and the opening of outer can 16 is clogged up by a sealing assembly 17. Hereinafter, for convenience of description, the sealing assembly 17 side of secondary battery 10 is on the upper side, and the bottom side of outer can 16 is on the bottom side.

For example, a non-aqueous electrolyte is used for the electrolyte. The non-aqueous electrolyte contains a non-aqueous solvent and an electrolyte salt dissolved in the non-aqueous solvent. As the non-aqueous solvent, for example, an ester, an ether, a nitrile, an amide, or a mixed solvent of two or more thereof may be used. The non-aqueous solvent may include a halogenated substance obtained by replacing at least a part of hydrogen atoms of such a solvent with halogen atoms such as fluorine. The non-aqueous electrolyte is not limited to a liquid electrolyte, and may be a solid electrolyte. As the electrolyte salt, for example, a lithium salt such as $LiPF_6$ is used. An example of a suitable secondary battery 10 is a non-aqueous electrolyte secondary battery, such as a lithium ion battery.

Electrode assembly 14 is composed of a long positive electrode 11, a long negative electrode 12, two long separators 13, a positive electrode tab 20 bonded to positive electrode 11, and a negative electrode tab 21 bonded to negative electrode 12. Negative electrode 12 is formed to have a size that is one size larger than that of positive electrode 11 in order to prevent the precipitation of lithium. Accordingly, negative electrode 12 is formed longer than positive electrode 11 both in the longitudinal direction and in the width direction (short direction). Two separators 13 are formed at least one size larger than positive electrode 11, and are disposed so as to sandwich positive electrode 11, for example.

Insulating plates 18 and 19 are disposed above and below electrode assembly 14, respectively. In the example shown in FIG. 1, positive electrode tab 20 attached to positive electrode 11 extends to the sealing assembly 17 side through the through hole of an insulating plate 18, and negative electrode tab 21 attached to negative electrode 12 extends to the bottom side of outer can 16 through the outside of an insulating plate 19. Positive electrode tab 20 is connected to the lower surface of an internal terminal plate 23 of sealing assembly 17 by welding or the like, and a cap 27 that is a top plate of sealing assembly 17 electrically connected to internal terminal plate 23, serves as a positive electrode terminal. Negative electrode tab 21 is connected to the inner surface of the bottom of outer can 16 by welding or the like, and outer can 16 serves as a negative electrode terminal.

Outer can 16 has a grooved portion 22 that supports sealing assembly 17, which is formed by pressing for example, the side surface portion from outside. Grooved portion 22 is preferably formed in an annular shape along the circumferential direction of outer can 16, and supports sealing assembly 17 on the upper surface thereof. A gasket 28 is provided between outer can 16 and sealing assembly 17, and seals inside the battery. Moreover, the upper end portion of outer can 16 is bent inward and crimped to the circumferential edge portion of sealing assembly 17.

Sealing assembly 17 has a structure in which internal terminal plate 23, a lower vent member 24, an insulating member 25, an upper vent member 26, and cap 27 are stacked in this order from the electrode assembly 14 side. The members constituting sealing assembly 17 have, for example, a disk shape or a ring shape, and the members except insulating member 25 are electrically connected to each other. Lower vent member 24 and upper vent member 26 are connected at their respective central portions, and insulating member 25 is interposed between the respective circumferential edge portions. When the internal pressure of the battery rises due to abnormal heat generation, lower vent member 24 deforms and breaks so as to push upper vent member 26 toward the cap 27 side, so that a current path between lower vent member 24 and upper vent member 26 is blocked. When the internal pressure further rises, upper vent member 26 breaks and gas is discharged from the opening of cap 27.

Positive electrode 11, negative electrode 12, and separator 13, which constitute electrode assembly 14 in particular positive electrode 11, will be described in detail below.

[Positive Electrode]

Positive electrode 11 has a positive electrode current collector 30, a positive electrode mixture layer 31 (first positive electrode mixture layer) formed on a first surface 30A of positive electrode current collector 30 facing inside of electrode assembly 14, and a positive electrode mixture layer 32 (second positive electrode mixture layer) formed on a second surface 30B of positive electrode current collector 30 facing outside of electrode assembly 14. As positive electrode current collector 30, a metal foil stable in a potential range of positive electrode 11, such as aluminum or an aluminum alloy, a film in which the metal is arranged on the surface layer, or the like can be used. The thickness of positive electrode current collector 30 is, for example, 5 µm or more and 20 µm or less. Positive electrode mixture layers 31 and 32 each includes a positive electrode active material, a conductive agent, and a binder. The thicknesses of positive electrode mixture layers 31 and 32 are, for example, substantially the same as each other, and these are preferably 50 µm or more and 150 µm or less, and more preferably 80 µm or more and 120 µm or less.

Positive electrode mixture layer 31 includes the first positive electrode active material, and positive electrode mixture layer 32 includes the second positive electrode active material. More specifically, positive electrode mixture layers 31 and 32 include positive electrode active materials different from each other in average surface roughness. The compositions of the first positive electrode active material and the second positive electrode active material may be the same as or different from each other. Positive electrode mixture layers 31 and 32 may be the same or different in content of the positive electrode active material. Moreover, positive electrode mixture layers 31 and 32 may be the same or different in type and content of the conductive agent and the binder. Positive electrode 11 can be fabricated by coating, for example, one surface of positive electrode current collector 30, which is to be first surface 30A with a first positive electrode mixture slurry including the first positive electrode active material, etc., coating the other surface of positive electrode current collector 30, which is to be second surface 30B with a second positive electrode mixture slurry including the second positive electrode active material, etc., drying the coating film, removing the dispersion medium, and then compressing the coating film to form positive electrode mixture layers 31 and 32 on the surfaces of positive electrode current collector 30.

Both the first positive electrode active material and the second positive electrode active material are composed of lithium transition metal composite oxides as main components. Metal elements included in the lithium transition metal composite oxide include Ni, Co, Mn, Al, B, Mg, Ti, V, Cr, Fe, Cu, Zn, Ga, Sr, Zr, Nb, In, Sn, Ta, Mo, Ce, K, and W. The lithium transition metal composite oxide preferably includes at least one selected from the group consisting of Ni, Co, and Mn. An example of a suitable lithium transition metal composite oxide is a composite oxide including Ni, Co and Mn, and a composite oxide including Ni, Co and Al. It is noted that particles of an inorganic compound such as aluminum oxide or a lanthanoid-containing compound may be adhered to the particle surface of the composite oxide.

The median diameters by volume of the first positive electrode active material and the second positive electrode active material (hereinafter referred to as "D50") are, for example, substantially the same as each other, and these are preferably 4 µm or more and 30 µm or less, and more preferably 10 µm or more and 25 µm or less. D50 is a particle size having a volume integrated value of 50% in the particle size distribution measured by a laser diffraction/scattering method, and is also called a 50% particle size or a medium diameter. The first positive electrode active material and the second positive electrode active material are, for example, secondary particles in which primary particles are aggregated, and the primary particles are composed of crystallites.

The average particle size of the aforementioned primary particle is preferably 1 µm or more and 5 µm or less. If the average particle size of the primary particle is less than 1 µm, the surface roughness of the secondary particle may become too large. On the other hand, if the average particle size of the primary particle exceeds 5 the particle size of the secondary particle may become too large. The particle size of the primary particle is measured by using a scanning electron microscope (SEM). Specifically, 10 particles are randomly selected from the SEM image of the particles, obtained by observing the particles of the positive electrode active material at a magnification of 2000 times by SEM, the grain boundaries, etc., are observed, the maximum diameters of the respective primary particles are measured, and then the average value of those for the 10 particles is taken as an average particle size.

The average surface roughness of the first positive electrode active material included in positive electrode mixture layer 31 is larger than the average surface roughness of the second positive electrode active material included in positive electrode mixture layer 32. The average surface roughness of the first positive electrode active material is preferably 2.3% or more and 20% or less, and more preferably 2.3% or more and 6.6% or less. On the other hand, the average surface roughness of the second positive electrode active material included in positive electrode mixture layer 32 is preferably 1% or more and 6.2% or less. The second positive electrode active material have the particles, the surfaces of which are less uneven and smooth, compared with the first positive electrode active material.

Since the second positive electrode active material has particles with smooth surfaces, the particles are apt to be densely packed with each other when compressed in the manufacturing process of positive electrode 11, and the density of positive electrode mixture layer 32 including the second positive electrode active material is apt to be high. On the other hand, positive electrode mixture layer 31 including the first positive electrode active material having particles with rough surfaces, which are caught by each other in the compression step and are difficult to be densely packed, are apt to have a lower density than positive electrode mixture layer 32. By winding positive electrode 11 having a density difference, such as the expression of [the density of positive electrode mixture layer 31<the density of positive electrode mixture layer 32] together with negative electrode 12 and separator 13, positive electrode mixture layer 31 is compressed to increase a density thereof, and positive electrode mixture layer 32 is stretched to lower a density thereof. Therefore, it is probable that positive electrode 11 satisfies the expression of [the density of positive electrode mixture layer 31=the density of positive electrode mixture layer 32], improving cycle characteristics of the battery.

The surface roughness of the positive electrode active material is measured based on the SEM image of the particles according to the method described in International Publication No. WO2011/125577. The formula for calculating the surface roughness is as follows:

Surface roughness=(maximum value of amount of change in particle radius at every 1°)/(maximum particle diameter)

The average surface roughness is calculated by averaging the surface roughness values of 10 particles selected randomly. The method for measuring the average surface roughness will be described in detail below.

The circularities of the first positive electrode active material and the second positive electrode active material are, for example, substantially the same as each other, and are preferably 0.85 or more, and more preferably 0.88 or more from the viewpoint of filling properties, etc., in the mixture layers. The circularity of the positive electrode active material is an index of spheroidization when a particle is projected onto a two-dimensional plane, and is measured from the particle image obtained by placing the sample in the measurement system and irradiating the sample stream with strobe light. The formula for calculating the circularity is as follows:

Circularity=(perimeter of a circle with the same area as the particle image)/(perimeter of the particle image)

It is noted that, when the particle image is a perfect circle, the circularity is 1.

As described above, the first positive electrode active material and the second positive electrode active material are composed of the lithium transition metal composite oxides, and they are composed of, for example, a composite oxide having a crystal structure of a layered rock salt type, represented by the general formula $Li_xNi_yM_{1-y}O_2$, wherein $0.1 \leq x \leq 1.2$, $0.3<y<1$, and M is at least one metal element selected from the group consisting of Ni, Co, Mn, Al, B, Mg, Ti, V, Cr, Fe, Cu, Zn, Ga, Sr, Zr, Nb, In, Sn, Ta, Mo, Ce, K, and W.

The lithium transition metal composite oxide may be synthesized from a lithium raw material, or may be synthesized by a method for synthesizing a sodium transition metal composite oxide and then ion-exchanging sodium with lithium. The sodium transition metal composite oxide is synthesized by using transition metal compounds, such as a sodium raw material and nickel. A composite oxide having no distorted crystal structure can be synthesized by setting the firing temperature to 600° C. to 1100° C. in the synthesis of the sodium transition metal composite oxide. Moreover, the lithium transition metal composite oxide obtained by ion exchange is substantially spherical and has an average surface roughness of 20% or less.

The sodium raw material for use is at least one selected from the group consisting of sodium (metallic sodium) and sodium compounds. Specifically, oxides such as $Na_2O$ and $Na_2O_2$, salts such as $Na_2CO_3$ and $NaNO_3$, and hydroxides such as NaOH are exemplified. Among these, $NaNO_3$ is preferred. The transition metal compound may be any of, for example, an oxide, a salt, a hydroxide, an oxide hydroxide. For the case of a nickel compound, oxides such as $Ni_3O_4$, $Ni_2O_3$, and $NiO_2$, salts such as $NiCO_3$ and $NiCl_2$, hydroxides such as $Ni(OH)_2$, and oxide hydroxides such as NiOOH are exemplified. Among these, $NiO_2$ and $Ni(OH)_2$ are preferred.

A mixture of the sodium raw material and the transition metal compound can be prepared by using a conventionally known mixer. A sodium transition metal composite oxide can be synthesized by firing this mixture in the atmosphere or in an oxygen stream. The firing temperature is appropriately set according to the composition of the mixture, etc., and is preferably 600° C. to 1100° C. The firing time is preferably, for example, 1 hour to 50 hours when the firing temperature is 600° C. to 1100° C. After firing, the fired product is preferably pulverized if necessary.

The average surface roughness of the positive electrode active material can be adjusted, for example, by changing the firing temperature during the synthesis of the sodium transition metal composite oxide. The average surface roughness of the positive electrode active material tends to increase as lowering the firing temperature in the temperature range of 600° C. to 1100° C. As a specific example, when the composition of the sodium transition metal composite oxide is represented by $Na_{0.95}Ni_{0.35}Co_{0.35}Mn_{0.3}O_2$, and if the firing temperature is 500° C. or higher and 1100° C. or lower, the average surface roughness can be adjusted in the range of 1% or more and 20% or less.

The method for ion-exchanging sodium with lithium includes a method for adding a molten salt bed of a lithium salt to a sodium transition metal composite oxide and heat-treating it. The lithium salt is at least one selected from the group consisting of, for example, lithium nitrate, lithium sulfate, lithium chloride, lithium carbonate, lithium hydroxide, lithium iodide, and lithium bromide. Moreover, sodium can be ion-exchanged with lithium by immersing a sodium-containing transition metal oxide in a solution including a lithium salt. The temperature during the ion exchange treatment is preferably 150° C. to 400° C. The treatment time is preferably 2 hours to 20 hours and more preferably 5 hours to 15 hours.

It is noted that the lithium transition metal composite oxide synthesized by the ion exchange method may have a certain amount of sodium remaining due to incomplete ion exchange. In this case, the lithium transition metal composite oxide is represented by the general formula $Li_{xu}Na_{x(1-u)}Ni_yM_{1-y}O_2$. Here, u denotes an ion exchange ratio, and is preferably in the range of $0.95<u\leq1$.

As the conductive agents included in positive electrode mixture layers 31 and 32, carbon materials, such as carbon black, acetylene black, Ketjenblack, and graphite can be exemplified. As the binders included in positive electrode mixture layers 31 and 32, fluororesins, such as polytetrafluoroethylene (PTFE) and polyvinylidene fluoride (PVdF), polyacrylonitrile (PAN), polyimides, acrylic resins, and polyolefins, etc. can be exemplified. These resins may be used in combination with a cellulose derivative such as carboxymethyl cellulose (CMC) or a salt thereof, polyethylene oxide (PEO), or the like.

[Negative Electrode]

Negative electrode 12 has a negative electrode current collector 40 and a negative electrode mixture layer 41 formed on both sides of negative electrode current collector 40. For negative electrode current collector 40, a metal foil stable in the potential range of negative electrode 12, such as copper or a copper alloy, a film in which the metal is arranged on the surface layer, or the like can be used. The thickness of negative electrode current collector 40 is, for example, 5 μm or more and 20 μm or less. Negative electrode mixture layer 41 includes a negative electrode active material and a binder. The thickness of negative electrode mixture layer 41 is preferably 50 μm or more and 150 μm or less, and more preferably 80 μm or more and 120 μm or less on one side of negative electrode current collector 40. Negative electrode 12 can be produced by coating on negative electrode current collector 40 with a negative electrode mixture slurry including the negative electrode active material and the binder, drying the coating film, removing the dispersion medium, and then compressing the coating film to form negative electrode mixture layers 41 on both sides of negative electrode current collector 40.

In the present embodiment, the first negative electrode mixture layer formed on the first surface of negative electrode current collector 40 facing inside of electrode assembly 14 and the second negative electrode mixture layer formed on the second surface of negative electrode current collector 40 facing outside of electrode assembly 14 are composed of the same materials. That is to say, negative electrode mixture layers 41 formed on the first surface and the second surface of negative electrode current collector 40 include the same negative electrode active material. However, as is the case of positive electrode 11, of negative electrode 12 as well, the average surface roughness of the first negative electrode active material included in the first negative electrode mixture layer may be larger than the surface roughness of the second negative electrode active material included in the second negative electrode mixture layer. Alternatively, negative electrode 12 alone may have a structure including the two types of mixture layers.

Negative electrode mixture layer 41 includes, for example, a carbonaceous active material that reversibly absorbs and desorbs lithium ions as the negative electrode active material. The suitable carbonaceous active material is graphite that includes natural graphite such as scaly graphite, massive graphite and earthy graphite, and artificial graphite such as massive artificial graphite (MAG) and graphitized mesophase carbon microbeads (MCMB). Moreover, as the negative electrode active material, a Si-based active material composed of at least one of Si and a Si-containing compound may be used, or the carbonaceous active material and the Si-based active material may be combined for use.

As the binder included in negative electrode mixture layer 41, a fluororesin such as PTFE or PVdF, PAN, a polyimide, an acrylic resin, a polyolefin, or the like may also be used as in the case of positive electrode 11, but styrene-butadiene rubber (SBR) is preferably used. Moreover, negative electrode mixture layer 41 may include CMC or a salt thereof, a polyacrylic acid (PAA) or a salt thereof, and PVA, etc. The CMC or the salt thereof functions as a thickener for adjusting a viscosity of the negative electrode mixture slurry to an appropriate range, and also functions as a binder as in the case of SBR.

[Separator]

A porous sheet having ion permeability and insulating properties is used for separator 13. Specific examples of the porous sheet include a microporous thin film, a woven fabric, and a non-woven fabric. The material of separator 13 is suitably an olefin resin such as polyethylene or polypropylene, cellulose, or the like. Separator 13 may have either a single-layer structure or a multi-layer structure. A heat-resistant layer or the like may be formed on the surface of separator 13.

EXAMPLES

The present disclosure will be further described with reference to Examples below, but the present disclosure is not limited to these Examples.

Example 1

[Preparation of Positive Electrode Mixture Slurry (A)]

Sodium nitrate, nickel oxide, cobalt oxide, and manganese oxide were mixed so that the composite oxide represented by the general formula $Na_{0.95}Ni_{0.35}Co_{0.35}Mn_{0.3}O_2$ can be obtained, and the mixture was fired under the conditions of 750° C. and 35 hours to obtain a sodium transition metal composite oxide. A molten salt bed in which lithium nitrate and lithium hydroxide were mixed at a molar ratio of 61:39 was added in a 5-fold equivalent amount to the obtained sodium transition metal composite oxide. This mixture was heat-treated under the conditions of 200° C. for 10 hours to ion-exchange sodium in the composite oxide with lithium, and then washed with water to obtain a lithium transition metal composite oxide.

The crystal structure of the obtained lithium transition metal composite oxide was identified by a powder X-ray diffraction (XRD) measurement apparatus (RINT2200 manufactured by Rigaku Co., Ltd., source: Cu-Kα), resulting in that the crystal structure was a layered rock salt type. Moreover, the composition analysis was carried out with an inductively coupled plasma (ICP) emission spectroscopic analyzer (iCAP6300 manufactured by Thermo Fisher Scientific Co., Ltd.), resulting in that the composition was $Li_{0.95}Ni_{0.35}Co_{0.35}Mn_{0.3}O_2$. The lithium transition metal composite oxide was classified to obtain a positive electrode active material (A).

92 parts by weight of positive electrode active material (A), 5 parts by weight of carbon powder, and 3 parts by weight of PVdF were mixed, and N-methyl-2-pyrrolidone was used as a dispersion medium to prepare a positive electrode mixture slurry (A).

[Preparation of Positive Electrode Mixture Slurry (B)]

A positive electrode mixture slurry (B) was prepared by synthesizing a positive electrode active material (B) in the same manner as in the case of positive electrode active material (A) except that the firing temperature when synthesizing the aforementioned sodium transition metal composite oxide was changed from 750° C. to 1100° C.

[About Positive Electrode Active Materials (a, B)]

Figure 3A:
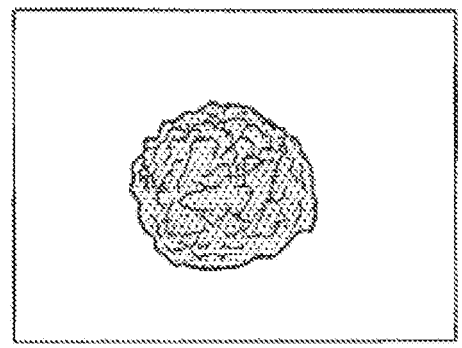
FIG. 3A is a view illustrating positive electrode active material (A) of Example 1.
Figure 4A:
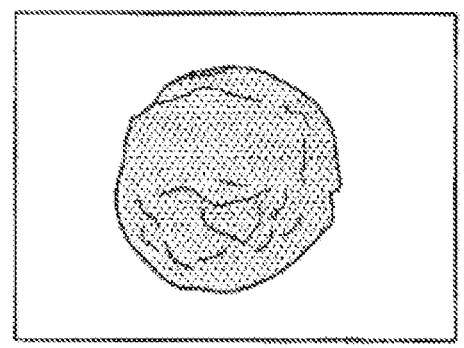
FIG. 4A is a view illustrating positive electrode active material (B) of Example 1.

As schematically shown in FIGS. 3A and 4A, positive electrode active material (B) had the particles, the surfaces of which were less uneven and smooth, compared with positive electrode active material (A). Positive electrode active material (A) had a D50 of 10.5 μm and an average surface roughness of 4.5%. Positive electrode active material (B) had a D50 of 10.0 μm and an average surface roughness of 1.1%.

[Fabrication of Positive Electrode]

One surface of the positive electrode current collector made of an aluminum foil was coated with positive electrode mixture slurry (A), and the other surface of the positive electrode current collector was coated with positive electrode mixture slurry (B). After the coating film was dried, the coating film was compressed by using a roller and cut to a predetermined electrode size to fabricate a positive electrode in which positive electrode mixture layer (A) was formed on one surface of the positive electrode current collector and positive electrode mixture layer (B) was formed on the other surface.

[Fabrication of Negative Electrode]

Graphite powder was used as the negative electrode active material. 99 parts by weight of the negative electrode active material and 1 part by weight of CMC were dry-mixed, and water was added to the mixed powder to prepare an aqueous dispersion having a solid content concentration of 50% by weight. A negative electrode mixture slurry was prepared by adding a dispersion of SBR to this aqueous dispersion in an amount of 1% by weight relative to the negative electrode active material. Both sides of a negative electrode current collector made of a copper foil were coated with this negative electrode mixture slurry, the coating film was dried, and then the coating film was compressed by using a roller and cut to a predetermined electrode size to fabricate a negative electrode in which the negative electrode mixture layers were formed on both sides of the negative electrode current collector.

[Fabrication of Electrode Assembly]

The aforementioned positive electrode and the negative electrode were wound around a winding core having a radius of curvature of 1.5 mm via a separator made of a polyethylene microporous film having a thickness of 20 μm, and a tape was attached to the outermost circumferential surface to fabricate a cylindrical winding-type electrode assembly. At this time, the positive electrode was wound so that positive electrode mixture layer (A) faced the winding core side. In addition, an aluminum positive electrode lead was welded to the current collector exposed portion of the positive electrode, and a nickel negative electrode lead was welded to the current collector exposed portion of the negative electrode, respectively.

[Preparation of Non-Aqueous Electrolyte]

Vinylene carbonate was dissolved in a mixed solvent in which ethylene carbonate, dimethyl carbonate, and ethyl methyl carbonate were mixed at a volume ratio of 20:60:20 and a concentration of 2% by weight. Then, $LiPF_6$ was dissolved to a concentration of 1.3 mol/liter to prepare a non-aqueous electrolyte.

[Battery Fabrication]

The aforementioned electrode assembly was housed in a bottomed cylindrical outer can, and the positive electrode lead was welded to the sealing assembly and the negative electrode lead was welded to the inner surface of the bottom of outer can, respectively. After injecting the non-aqueous electrolyte into the outer can, the opening of the outer can was sealed with a sealing assembly to fabricate a non-aqueous electrolyte secondary battery (height of 65 mm, diameter of 18 mm, and design capacity of 3,000 mAh).

Example 2

A positive electrode and a non-aqueous electrolyte secondary battery were fabricated in the same manner as in Example 1 except that the firing temperature when synthesizing the sodium transition metal composite oxide was changed from 1100° C. to 900° C. in the synthesis of positive electrode active material (B).

Example 3

A positive electrode and a non-aqueous electrolyte secondary battery were fabricated in the same manner as in Example 1 except that the firing temperature when synthesizing the sodium transition metal composite oxide was changed from 1100° C. to 800° C. in the synthesis of positive electrode active material (B).

Example 4

A positive electrode and a non-aqueous electrolyte secondary battery were fabricated in the same manner as in Example 1 except that the firing temperature when synthesizing the sodium transition metal composite oxide was changed from 750° C. to 600° C. in the synthesis of positive electrode active material (A).

Example 5

A positive electrode and a non-aqueous electrolyte secondary battery were fabricated in the same manner as in Example 4 except that the firing temperature when synthesizing the sodium transition metal composite oxide was changed from 1100° C. to 800° C. in the synthesis of positive electrode active material (B).

Example 6

A positive electrode and a non-aqueous electrolyte secondary battery were fabricated in the same manner as in Example 1 except that the firing temperature when synthesizing the sodium transition metal composite oxide was changed from 750° C. to 550° C. in the synthesis of positive electrode active material (A), and the firing temperature of the sodium transition metal composite oxide was changed from 1100° C. to 600° C. in the synthesis of positive electrode active material (B).

Example 7

A positive electrode and a non-aqueous electrolyte secondary battery were fabricated in the same manner as in Example 1 except that the firing temperature when synthesizing the sodium transition metal composite oxide was changed from 750° C. to 900° C. in the synthesis of positive electrode active material (A).

Comparative Example 1

A positive electrode and a non-aqueous electrolyte secondary battery were fabricated in the same manner as in Example 1 except that the firing temperature when synthesizing the sodium transition metal composite oxide was changed from 1100° C. to 750° C. in the synthesis of positive electrode active material (B).

Comparative Example 2

A positive electrode and a non-aqueous electrolyte secondary battery were fabricated in the same manner as in Comparative Example 1 except that the firing temperature when synthesizing the sodium transition metal composite oxide was changed from 750° C. to 1100° C. in the synthesis of positive electrode active material (A).

Comparative Example 3

A positive electrode and a non-aqueous electrolyte secondary battery were fabricated in the same manner as in Comparative Example 1 except that the firing temperature when synthesizing the sodium transition metal composite oxide was changed from 750° C. to 900° C. in the synthesis of positive electrode active material (A).

Comparative Example 4

A positive electrode and a non-aqueous electrolyte secondary battery were fabricated in the same manner as in Example 6 except that the firing temperature when synthesizing the sodium transition metal composite oxide was changed from 600° C. to 550° C. in the synthesis of positive electrode active material (B).

Comparative Example 5

A positive electrode and a non-aqueous electrolyte secondary battery were fabricated in the same manner as in Example 1 except that the firing temperature when synthesizing the sodium transition metal composite oxide was changed from 750° C. to 1100° C. in the synthesis of positive electrode active material (A).

Each of the positive electrode active materials and non-aqueous electrolyte secondary batteries of Examples and Comparative Examples was evaluated by the following methods. The evaluation results are shown in Table 1.

[Average Surface Roughness]

10 particles were randomly selected from the particle image obtained by SEM observation (magnification of 2000 times) of each positive electrode active material, and the maximum value of the amount of change in the particle radius at every 1° and the maximum particle diameter were measured, and the surface roughness was calculated by the following formula:

Surface roughness=(maximum value of amount of change in particle radius at every 1°)/(maximum particle diameter)

The amount of change in the particle radius at every 1° is an absolute value, and the maximum value denotes the maximum of the amount of change at every 1° measured over the entire circumference of the active material particle.

Figure 3B:
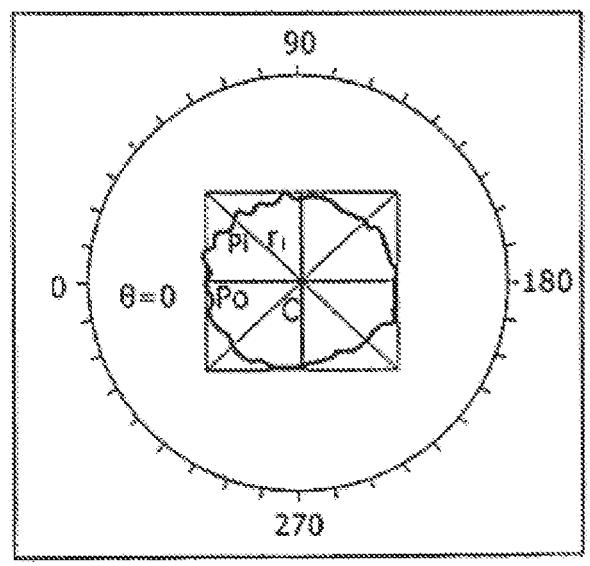
FIG. 3B is a view for illustrating a measurement method of an average surface roughness of positive electrode active material (A) of Example 1.
Figure 4B:
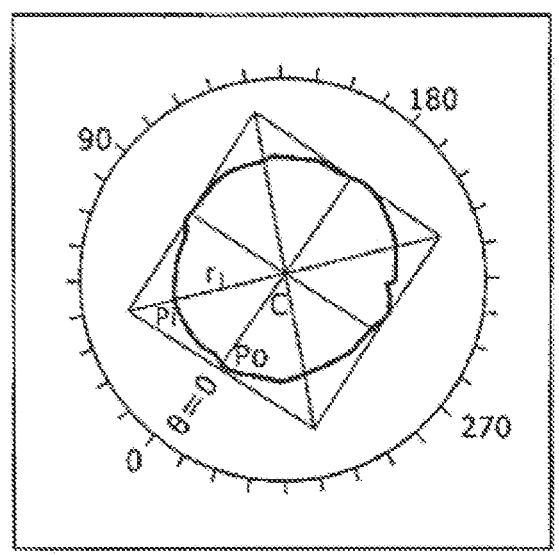
FIG. 4B is a view for illustrating a measurement method of an average surface roughness of positive electrode active material (B) of Example 1.

FIG. 3B is a view illustrating a circumferential shape obtained from the particle image of positive electrode active material (A) of Example 1. FIG. 4B is a view illustrating a circumferential shape obtained from the particle image of positive electrode active material (B) of Example 1. In FIGS. 3B and 4B, the distance from a center position C to each point Pi on the particle circumference is measured as a particle radius ri. Center position C is a position that bisects the maximum particle diameter. The circumferential position of the particle having the maximum particle radius ri was set as a reference point $P_0$ ($\theta=0$). The angle formed by a line segment $CP_0$ connecting reference point $P_0$ and center position C and a line segment CPi formed by other circumferential point Pi of the particle and center position C is defined as $\theta$, and the particle radius ri at every 1° in $\theta$ was determined. The average surface roughness was calculated by averaging the surface roughness of 10 particles randomly selected.

[D50]

The D50 of each positive electrode active material was measured by using a laser diffraction/scattering type particle size distribution measurement apparatus (LA-750 manufactured by HORIBA, Ltd.) by using water as a dispersion medium.

[Circularity]

The circularity of each positive electrode active material was measured by using a flow-type particle image analyzer (FPIA-2100 manufactured by Sysmex Corporation). The number of target particles was 5000 or more, and ion-exchanged water supplemented with polyoxylene sorbitan monolaurate was used as the dispersion medium.

[Cycle Characteristics (Capacity Retention Ratio)]

Batteries of Examples and Comparative Examples were each charged and discharged under the following conditions in a temperature environment of 25° C., and the capacity retention ratio was determined.

<Charge/Discharge Conditions>

After constant current charge was carried out at a constant current of 0.3 It=900 mA until the cell voltage reached 4.2 V, constant voltage charge was carried out at a voltage of 4.2 V until the current value reached 150 mA. Subsequently, constant current discharge was carried out at a constant current of 900 mA until the cell voltage reached 2.75 V. This charge/discharge was carried out for 1000 cycles, and the capacity retention ratio was calculated by the following formula:

Capacity retention ratio (%)=discharging capacity at 1000th cycle÷discharging capacity at 1st cycle× 100

TABLE 1

| | Positive electrode active material (A) | | | Positive electrode active material (B) | | | Capacity retention ratio |
|---|---|---|---|---|---|---|---|
| | Average surface roughness | D50 | Circularity | Average surface roughness | D50 | Circularity | |
| Example 1 | 4.5% | 10.5 μm | 0.90 | 1.1% | 10.0 μm | 0.91 | 83% |
| Example 2 | 4.5% | 10.5 μm | 0.90 | 2.3% | 9.8 μm | 0.90 | 82% |
| Example 3 | 4.5% | 10.5 μm | 0.90 | 3.9% | 10.1 μm | 0.91 | 81% |
| Example 4 | 6.2% | 10.0 μm | 0.90 | 1.1% | 10.0 μm | 0.91 | 83% |
| Example 5 | 6.2% | 10.0 μm | 0.90 | 3.9% | 10.1 μm | 0.91 | 83% |
| Example 6 | 6.6% | 10.7 μm | 0.89 | 6.2% | 10.0 μm | 0.90 | 81% |
| Example 7 | 2.3% | 9.8 μm | 0.90 | 1.1% | 10.0 μm | 0.91 | 81% |
| Comparative Example 1 | 4.5% | 10.5 μm | 0.90 | 4.5% | 10.5 μm | 0.90 | 76% |
| Comparative Example 2 | 1.1% | 10.0 μm | 0.91 | 4.5% | 10.5 μm | 0.90 | 71% |
| Comparative Example 3 | 2.3% | 9.8 μm | 0.90 | 4.5% | 10.5 μm | 0.90 | 72% |
| Comparative Example 4 | 6.6% | 10.7 μm | 0.89 | 6.6% | 10.7 μm | 0.89 | 75% |
| Comparative Example 5 | 1.1% | 10.0 μm | 0.91 | 1.1% | 10.0 μm | 0.91 | 76% |

As shown in Table 1, all the batteries of Examples have higher capacity retention ratios and excellent cycle characteristics than the batteries of Comparative Examples.

REFERENCE SIGNS LIST

10 secondary battery, 11 positive electrode, 12 negative electrode, 13 separator, 14 electrode assembly, 16 outer can, 17 sealing assembly, 18, 19 insulating plate, 20 positive electrode tab, 21 negative electrode tab, 22 grooved portion, 23 internal terminal plate, 24 lower vent member, 25 insulating member, 26 upper vent member, 27 cap, 28 gasket, 30 positive electrode current collector, 30A first surface, 30B second surface, 31, 32 positive electrode mixture layer, 40 negative electrode current collector, 41 negative electrode mixture layer

The invention claimed is:

1. A secondary battery comprising a winding-type electrode assembly in which a positive electrode and a negative electrode are wound with a separator interposed therebetween, wherein
the positive electrode has a current collector, a first mixture layer formed on a first surface of the current collector facing the inside of the electrode assembly, and a second mixture layer formed on a second surface of the current collector facing the outside of the electrode assembly, and wherein
in the positive electrode, the first mixture layer includes a first active material, the second mixture layer includes a second active material, and an average surface roughness of the first active material is larger than an average surface roughness of the second active material,
wherein the average surface roughness of the first active material is 2.3% or more and 20% or less, and the average surface roughness of the second active material is 1% or more and 4.6% or less.

2. The secondary battery according to claim 1, wherein the first active material and the second active material have median diameters by volume of 4 μm or more and 30 μm or less.

3. The secondary battery according to claim 2, wherein the mean diameter by volume of the first active material and the second active material are between 10 μm or more and 25 μm or less.

4. The secondary battery according to claim 1, wherein the first positive electrode active material and the second positive electrode active material are secondary particles in which primary particles are aggregated, and the average particle size of the primary particle is 1 μm or more and 5 μm or less.

5. The secondary battery according to claim 1, wherein each of the first mixture layer and the second mixture layer further comprise a conductive agent and a binder.

6. The secondary battery according to claim 5, wherein the conductive agent is selected from the group consisting of carbon black, acetylene black, Ketjenblack, and graphite.

7. The secondary battery according to claim 5, wherein the binder is selected from the group consisting of polytetrafluoroethylene, polyvinylidene fluoride, polyacrylonitrile, polyimides, acrylic resins, and polyolefins.

* * * * *